United States Patent
He et al.

(10) Patent No.: US 12,432,463 B2
(45) Date of Patent: Sep. 30, 2025

(54) FLEXIBLE FILTER SPECTRAL CAMERA

(71) Applicants: Hainan Institute of Zhejiang University, Sanya (CN); Zhejiang University, Zhejiang (CN); Shandong (Linyi) Institute of Modern Agriculture, Zhejiang University, Shandong (CN); Hangzhou Peilan Aviation Technology Co., Ltd., Zhejiang (CN)

(72) Inventors: Yong He, Linyi (CN); Liwen He, Linyi (CN); Pengcheng Nie, Linyi (CN); Wenna Zhang, Linyi (CN)

(73) Assignees: Hainan Institute of Zhejiang University, Sanya (CN); Zhejiang University, Hangzhou (CN); Shandong (Linyi) Institute of Modern Agriculture, Zhejiang University, Linyi (CN); Hangzhou Peilan Aviation Technology Co., Ltd., Hangzhou (CN)

( * ) Notice: Subject to any disclaimer, the term of this patent is extended or adjusted under 35 U.S.C. 154(b) by 116 days.

(21) Appl. No.: 18/219,686

(22) Filed: Jul. 9, 2023

(65) Prior Publication Data
US 2024/0305904 A1    Sep. 12, 2024

(30) Foreign Application Priority Data
Mar. 9, 2023    (CN) .......................... 202310232236.7

(51) Int. Cl.
*H04N 25/13*    (2023.01)
*G02B 5/20*    (2006.01)
(Continued)

(52) U.S. Cl.
CPC ............. *H04N 25/13* (2023.01); *G02B 5/201* (2013.01); *H04N 23/10* (2023.01); *H04N 25/78* (2023.01)

(58) Field of Classification Search
CPC ........ H04N 25/13; H04N 23/10; H04N 25/78; H04N 23/125; G02B 5/201; G03B 11/00;
(Continued)

(56) References Cited

U.S. PATENT DOCUMENTS

| | | | |
|---|---|---|---|
| 4,575,232 A * | 3/1986 | Rulf ........................ | G01C 11/04 355/77 |
| 11,272,830 B2 * | 3/2022 | Kamon ............ | A61B 1/000094 |

(Continued)

FOREIGN PATENT DOCUMENTS

JP    2710317 B2 *    2/1998    ............. H04N 23/12

OTHER PUBLICATIONS

MT9F032: ¼-Inch 1.6Mp CMOS Digital Image Sensor—@2007 Micron Technology, Inc. (Year: 2007).*

*Primary Examiner* — Nhan T Tran
(74) *Attorney, Agent, or Firm* — Harness, Dickey & Pierce, P.L.C.

(57) ABSTRACT

Disclosed is a flexible filter spectral camera. A flexible filter module includes N flexible filter units corresponding to N different wavebands, respectively, where N is a positive integer greater than or equal to 2. A CMOS (Complementary Metal Oxide Semiconductor) module is used to convert incident light into a digital signal. Any one of the N flexible filter units can be switched to a preset position to filter light emitted from a lens and transmit light at a corresponding waveband to the CMOS module. The preset position is between the lens and the CMOS module. An image processor is connected to the CMOS module and is used to convert the digital signal into an image. In accordance with the (Continued)

present disclosure, precision imaging of the lens is achieved, the overlapping accuracy and imaging quality of the images are improved, and meanwhile, the processing efficiency for overlapped images is improved.

9 Claims, 3 Drawing Sheets

(51) Int. Cl.
*H04N 23/10* (2023.01)
*H04N 25/78* (2023.01)

(58) Field of Classification Search
CPC ........ G03B 17/14; G03B 30/00; G03B 33/08; G01J 3/0227; G01J 3/2803; G01J 3/2823; G01J 2003/2826
See application file for complete search history.

(56) References Cited

U.S. PATENT DOCUMENTS

| | | | |
|---|---|---|---|
| 2002/0196456 A1* | 12/2002 | Komiya | H04N 1/6086 358/1.9 |
| 2004/0160614 A1* | 8/2004 | Komiya | H04N 1/603 358/1.9 |
| 2011/0181757 A1* | 7/2011 | Fish | H04N 23/125 348/E5.053 |
| 2015/0163408 A1* | 6/2015 | Laroia | H04N 5/77 348/208.1 |
| 2017/0303790 A1* | 10/2017 | Bala | H04N 23/57 |

\* cited by examiner

FLEXIBLE FILTER SPECTRAL CAMERA

CROSS-REFERENCE TO RELATED APPLICATION

This patent application claims the benefit and priority of Chinese Patent Application No. 2023102322367, filed with the China National Intellectual Property Administration on Mar. 9, 2023, the disclosure of which is incorporated by reference herein in its entirety as part of the present application.

TECHNICAL FIELD

The present disclosure relates to the technical field of spectral cameras, and in particular to a flexible filter spectral camera.

BACKGROUND

Unmanned aerial vehicle is usually equipped with a multi-lens spectral camera. The multi-lens spectral camera generally has four to nine lenses, and each lens has a filter allowing a narrow spectrum of light to pass through and project the light onto the photosensitive sensor CMOS (Complementary Metal Oxide Semiconductor) to be converted into an electrical signal, and then the electric signal is converted into a required image after being processed by an analog-to-digital converter, an amplifier, an image processor, etc.

According to the multi-lens spectral camera, the same scene is simultaneously shot by utilizing multiple lenses, and the image information of several different spectral bands is simultaneously recorded by using one film. However, the multi-lens spectral camera is difficult to focus on the same place accurately, leading to poor overlapping precision and imaging quality, and prolonged processing time for overlapped images.

SUMMARY

An objective of the embodiment of the present disclosure is to provide a flexible filter spectral camera, which is used to achieve precision imaging of a lens, improve overlapping precision and imaging quality of images, and improve the processing efficiency for overlapped images at the same time.

In order to achieve the above objective, the embodiment of the present disclosure provides the following solution for a flexible filter spectral camera that includes a lens 1; a flexible filter module 2, including N flexible filter units corresponding to N different wavebands, respectively, where N is a positive integer greater than or equal to 2; a CMOS (Complementary Metal Oxide Semiconductor) module 10, used to convert incident light into a digital signal, where any one of N flexible filter units can be switched to a preset position to filter light emitted from the lens 1, and to transmit light at a corresponding waveband to the CMOS module 10, and the preset position is between the lens 1 and the CMOS module 10; and an image processor 9, connected to the CMOS module 10, and used to convert the digital signal into an image.

Alternatively, the wavelength range of a waveband corresponding to any flexible filter unit is determined by a first wavelength threshold and a second wavelength threshold, and the first wavelength threshold is larger than the second wavelength threshold.

The any flexible filter unit includes a short-wave pass filter for the passing of light shorter than the first wavelength threshold and the cutoff of light longer than the first wavelength threshold; and a long-wave pass filter for the passing of the light longer than the second wavelength threshold and the cutoff of the light shorter than the second wavelength threshold.

Alternatively, the short-wave pass filter and the long-wave pass filter are overlapped.

Alternatively, the spectral camera further includes a tachometer generator 5, connected to the flexible filter module 2, and used to drive the flexible filter module 2 to rotate, thus enabling each flexible filter unit to reach the preset position.

The tachometer generator 5 is also used to measure an own rotating speed value.

Alternatively, the spectral camera further includes a magnetic intensity code arranged on any flexible filter unit, where the magnetic intensity code is used to characterize the first wavelength threshold and the second wavelength threshold corresponding to the any flexible filter unit; and a linear Hall sensor 3, located at the preset position, where the linear Hall sensor 3 is used to generate a sensing signal as a position signal under an action of the magnetic intensity code on the any flexible filter unit when the any flexible filter unit reaches the preset position.

Alternatively, the spectral camera further includes a controller 6, connected to the tachometer generator 5, and used to control the tachometer generator 5 to operate, so as to drive the flexible filter module 2 to rotate; control the CMOS module 10 to convert incident light into a digital signal at a target frame rate when detecting a presence of a target flexible filter unit at the preset position, where the target flexible filter unit is any flexible filter unit, or a flexible filter unit corresponding to a required waveband.

Alternatively, the spectral camera further includes a controller 6, connected to the tachometer generator 5, and used to determine whether a target flexible filter unit exists at the preset position or not, where the target flexible filter unit is any flexible filter unit, or a flexible filter unit corresponding to a required waveband; if the target flexible filter unit does not exist at the preset position, control the tachometer generator 5 to operate, so as to drive the flexible filter module 2 to rotate; if the target flexible filter unit exists at the preset position, control the tachometer generator 5 to stop, thus enabling the target flexible filter unit to stay at the preset position; and, when a preset condition is satisfied, redetermine a target flexible filter unit, and return to execute the operation of determining whether the target flexible filter unit exists at the preset position or not and subsequent operations.

The redetermined target flexible filter unit includes a flexible filter unit corresponding to the next required waveband, or a flexible filter unit adjacent to the current target flexible filter unit.

Alternatively, the spectral camera further includes a controller 6, connected to the tachometer generator 5, and used to: determine whether a target flexible filter unit exists at the preset position or not, where the target flexible filter unit is any flexible filter unit; if the target flexible filter unit does not exist at the preset position, control the tachometer generator 5 to operate, so as to drive the flexible filter module 2 to rotate; if the target flexible filter unit exists at the preset position, control the tachometer generator 5 to stop, thus enabling the target flexible filter unit to stay at the preset position; and, when a preset condition is satisfied, after controlling the tachometer generator 5 to operate to drive the target flexible filter unit to leave the preset position, return to execute the operation of determining whether the target flexible filter unit exists at the preset position or not and subsequent operations.

Alternatively, the CMOS module 10 includes a CMOS sensor 4, used to convert incident light into an analog electrical signal.

Alternatively, the CMOS module 10 further includes an analog-to-digital converter 7, connected to the CMOS sensor 4, and used to convert the analog electrical signal into a digital signal; and an amplifier 8, connected to the analog-to-digital converter 7, and used to amplify the digital signal, so as to form an amplified digital signal.

In the embodiment of the present disclosure, the flexible filter module 2 includes N flexible filter units corresponding to N different wavebands, respectively. Through the use of the N flexible filter units, the redundant lenses of a multi-lens spectral camera can be reduced, and the imaging of multiple wavebands can be achieved by reducing to one lens 1. Meanwhile, the problem that various lenses of the multi-lens spectral camera is difficult to focus on the same place accurately is avoided, and the overlapping precision and imaging quality of images are improved.

The CMOS module 10 is used to convert incident light into a digital signal. Since it is necessary to perform later image processing on the overlapping portion, the image processor 9 has rapid imaging speed and simple imaging, and the processing efficiency for the overlapped images is improved.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
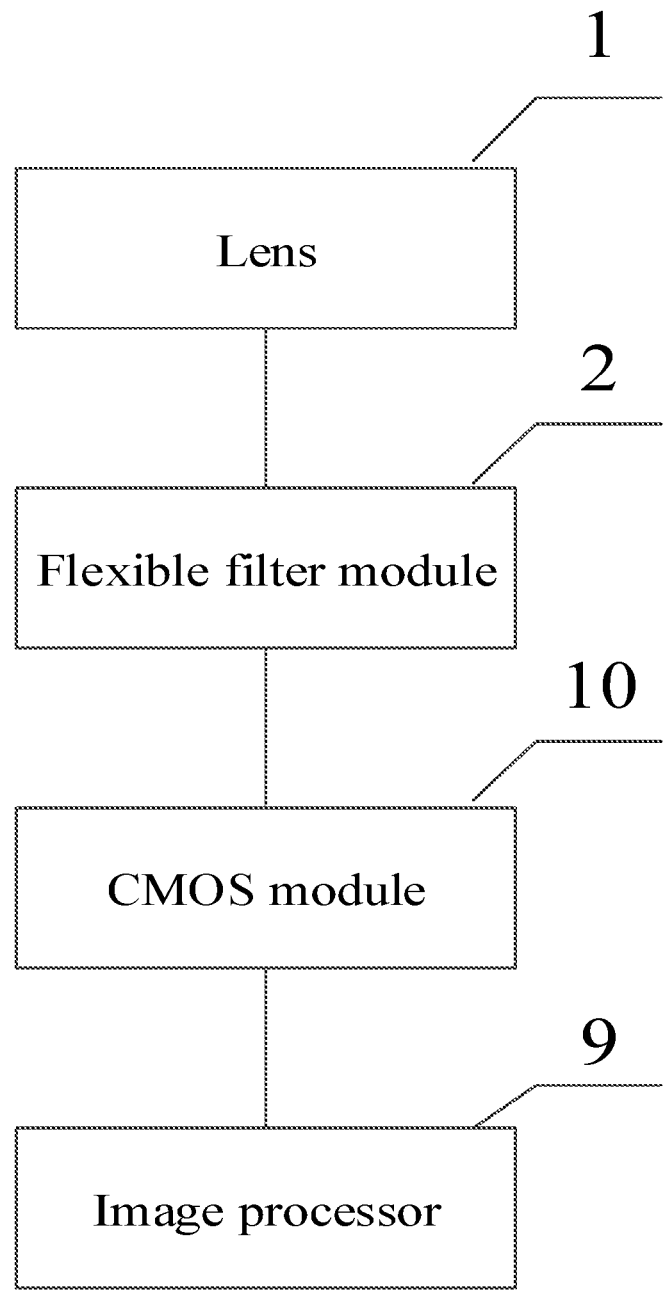
FIG. 1 is a structural schematic diagram of a flexible filter spectral camera in accordance with an embodiment of the present disclosure.

In the drawings:
1—lens; 2—flexible filter module; 3—linear Hall sensor; 4—CMOS sensor; 5—tachometer generator; 6—controller; 7—analog—to—digital converter; 8—amplifier; 9—image processor; 10—CMOS module.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the embodiment of the present disclosure is to provide a flexible filter spectral camera, which is used to achieve accurate imaging of the lens, improve overlapping accuracy and imaging quality of the image, and improve the processing efficiency of the overlapping images at the same time.

To make the objectives, features and advantages of the present disclosure more apparently and understandably, the following further describes the present disclosure in detail with reference to the accompanying drawings and the specific embodiments.

FIG. 1 illustrates an exemplary structure of the flexible filter spectral camera. The flexible filter spectral camera includes a lens 1, a flexible filter module 2, a CMOS module 10, and an image processor 9. Various devices are described in detail below.

Lens 1.

In one example, the lens 1 may specifically be a convex lens or the like, as long as the lens can converge light used for imaging into incident light.

In another example, the lens 1 may also include an illumination unit, which may be an LED light source, an incandescent lamp, etc., as long as visible light can be emitted, such that the lens 1 can still work in the absence of natural light.

The flexible filter module 2 includes N flexible filter units corresponding to N different wavebands, respectively, where N is a positive integer greater than or equal to 2.

In one example, those skilled in the art can design a value of N flexibly, e.g., six, eight, twelve, etc., which will not be described in detail here.

In the embodiment of the present disclosure, by taking N being twelve as an example, the flexible filter module 2 includes twelve flexible filter units corresponding to twelve different wavebands, respectively. Incident light having wavelengths from 450 nm to 1,000 nm is divided into twelve different wavebands according to the central wavelength, e.g., the wavebands having the central wavelengths of 450 nm, 500 nm, 550 nm, 600 nm, 650 nm, 700 nm, 750 nm, 800 nm, 850 nm, 900 nm, 950 nm and 1,000 nm, respectively, which correspond to twelve flexible filter units, respectively.

In another embodiment of the present disclosure, the flexible filter module 2 can be rotated or translated, and the position of the flexible filter module 2 can be changed by rotation or translation. The rotation or translation of the flexible filter module 2 can be achieved by manual adjustment and automatic adjustment. Manual adjustment means that the flexible filter unit is replaced manually by a user. Automatic adjustment means that the flexible filter module 2 is rotated or translated by a motor or the like, so as to change the position of the flexible filter unit. Corresponding flexible filter units can be fabricated according to the number of wavebands required by the user.

The CMOS module 10 is used to convert incident light into a digital signal, where any one of N flexible filter units can be switched to a preset position to filter light emitted from the lens 1, and to transmit the light at the corresponding waveband to the CMOS module 10. The preset position is between the lens 1 and the CMOS module 10.

In one example, any flexible filter unit can be switched to the preset position, which is the position where the lens 1 emits the light, and the light emitted from the lens 1 is the incident light above, which will not be described in detail here. The flexible filter unit is used to filter the incident light, that is, the flexible filter unit transmits the incident light at the desired waveband in the incident light and blocks the incident light at the unnecessary wavebands in the incident light, and the incident light at the required waveband is the light at the corresponding waveband. Then the light at the corresponding waveband is irradiated on the CMOS module 10, and the CMOS module 10 is used to convert the light at the corresponding waveband into a digital signal. The lens 1 may be located above the CMOS module 10, below the CMOS module 10, or in other directions, as long as the preset position is located between the lens 1 and the CMOS module 10.

The image processor 9 is connected to the CMOS module 10 and is used to convert the digital signal into an image.

In one example, the image processor 9 is electrically connected to the CMOS module 10, and the image processor 9 is used to convert the digital signal into an image after receiving the digital signal sent from the CMOS module 10.

In the embodiment of the present disclosure, the flexible filter module 2 includes N flexible filter units corresponding to N different wavebands, respectively. Through the use of the N flexible filter units, the redundant lenses of a multi-lens spectral camera can be reduced, and the imaging of multiple wavebands can be achieved by reducing to one lens 1. Meanwhile, the problem that various lenses of the multi-lens spectral camera is difficult to focus on the same place accurately is avoided, and the overlapping precision and imaging quality of images are improved.

The CMOS module 10 is used to convert the incident light into a digital signal. Since it is not necessary to perform post image processing on the overlapping portion, the image processor 9 has faster imaging speed and simple imaging, and improves the processing efficiency of the overlapping image.

In addition, the flexible filter spectral camera is not only suitable for the multispectral camera, but also can be used as a hyperspectral camera for use after the number of the flexible filter units is increased, i.e., the N is large enough.

Various devices are described in detail below.

The wavelength range of a waveband corresponding to any flexible filter unit is determined by a first wavelength threshold and a second wavelength threshold, in which the first wavelength threshold is greater than the second wavelength threshold.

Any flexible filter unit includes: a short-wave pass filter and a long-wave pass filter.

The short-wave pass filter is used for the passing of light shorter than the first wavelength threshold and the cutoff of light longer than the first wavelength threshold.

The long-wave pass filter is used for the passing of the light longer than the second wavelength threshold and the cutoff of the light shorter than the second wavelength threshold. In one example, each flexible filter unit consists of a layer of short-wave pass filter and a layer of long-wave pass filter, and the short-wave pass filter and the long-wave pass filter are overlapped. The dimensions of the flexible filter units are the same, including a length, a width and a thickness. Different flexible filter units may achieve the transmission of incident light at different wavebands by overlapping different short-wave pass filters and long-wave pass filters, so as to obtain the incident light at different wavebands required by the user.

For example, if the user needs the flexible filter unit for the passing of incident light having a wavelength of 760 nm±5 nm, when preparing the flexible filter unit, the long-wave pass filter of 755 nm and the short-wave pass filter of 765 nm need to be overlapped together. That is, 765 nm is the first wavelength threshold, and 755 nm is the second wavelength threshold. In this way, the short-wave pass filter is used for the passing of the incident light having a wavelength shorter than 765 nm and the cutoff of the incident light having a wavelength longer than 765 nm. The long-wave pass filter is used for the passing of the incident light having the wavelength longer than 755 nm and cuts off the incident light having the wavelength shorter than 755 nm, thus obtaining the incident light having the wavelength of 760 nm±5 nm.

In other embodiments of the present disclosure, the flexible filter spectral camera may also include a tachometer generator 5.

Figure 2:
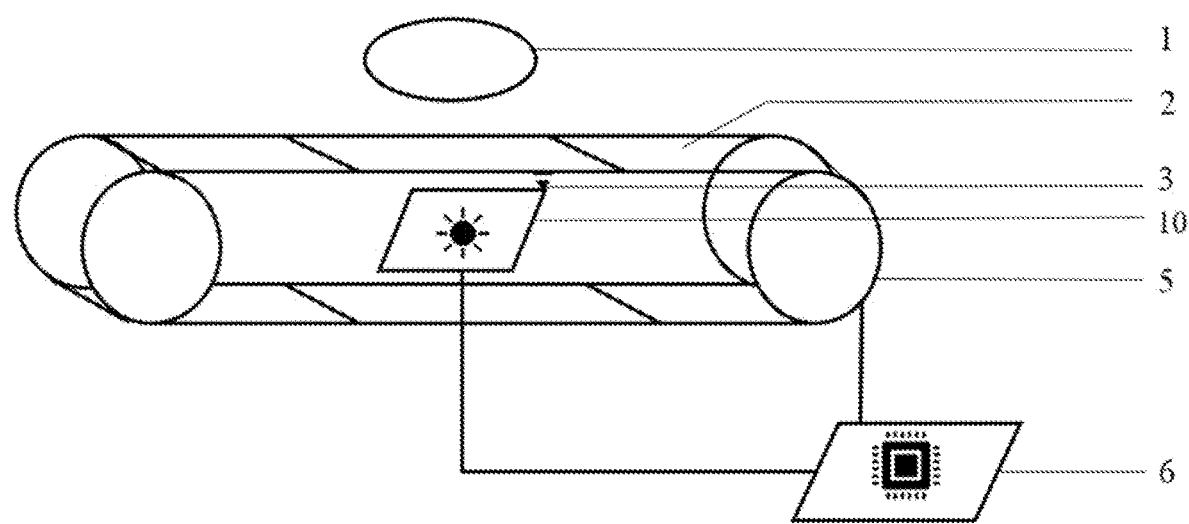
FIG. 2 is a schematic diagram of a detailed structure of a flexible filter spectral camera in accordance with an embodiment of the present disclosure.

Please referring to FIG. 2, the tachometer generator 5 is connected to the flexible filter module 2, and used to drive the flexible filter module 2 to rotate, thus enabling each flexible filter unit to reach the preset position.

The tachometer generator 5 is also used to measure the own rotating speed value.

In one example, a rotating shaft of the tachometer generator 5 is connected to a rotating shaft of the flexible filter module 2, or the rotating shaft of the speed measuring rotor may be connected to the rotating shaft of the flexible filter module 2 by a gear. The tachometer generator 5 rotates to drive the flexible filter module 2 to rotate circularly, and each flexible filter unit can pass through the bottom of the lens 1 and reach and stay at the preset position. When the flexible filter spectral camera starts to work, the tachometer generator 5 is started, the rotational speed is displayed on the tachometer generator 5. The rotational speed is adjustable.

In other embodiments of the present disclosure, the flexible filter spectral camera may also include a linear Hall sensor 3.

A magnetic intensity code is arranged on any flexible filter unit, and used to characterize the first wavelength threshold and the second wavelength threshold corresponding to any flexible filter unit.

In one example, the magnetic intensity code on the flexible filter unit may characterize the first wavelength threshold and the second wavelength threshold corresponding to the flexible filter unit, and different first and second wavelength thresholds may be characterized by changing the magnetic field intensity of the magnetic intensity code.

The linear Hall sensor 3 is located at the preset position. The linear Hall sensor 3 is used to generate a sensing signal as a position signal under an action of the magnetic intensity code on any flexible filter unit when any flexible filter unit reaches the preset position.

In one example, the linear Hall Sensor 3 is arranged at the preset position. When the flexible filter unit reaches the preset position, that is, the magnetic intensity code on the flexible filter unit reaches the preset position, the linear Hall Sensor 3 is used to generate electromagnetic induction with the magnetic intensity code, so as to generate an electrical signal, i.e., a sensing signal. The electrical signal can be used as the position signal. When no electrical signal is generated, the magnetic intensity code on the flexible filter unit reaches the preset position, that is, the flexible filter unit does not reach the preset position.

In other embodiments I of the present disclosure, the flexible filter spectral camera may also include a controller 6.

The controller 6 is electrically connected to the tachometer generator 5 and is used to:

control the tachometer generator 5 to operate, so as to drive the flexible filter module 2 to rotate.

In one example, the tachometer generator 5 is turned on under the control of the controller 6, so as to drive the flexible filter module 2 to rotate. The tachometer generator 5 is controlled by the controller 6 to stop, so as to drive the flexible filter module 2 to stop rotating.

The controller 6 is used to control the CMOS module 10 to convert the incident light into a digital signal at a target frame rate when detecting a presence of a target flexible filter unit at the preset position. The target flexible filter unit is any flexible filter unit, or a flexible filter unit corresponding to the required waveband.

In one example, the controller 6 is electrically connected to the CMOS module 10, the linear Hall sensor 3 and the tachometer generator 5 simultaneously. The controller 6 can be used to control the rotating speed of the tachometer generator 5. The controller 6 can be used to control a shooting frame rate of the CMOS Module 10. Therefore, the controller 6 can obtain the rotating speed of the tachometer generator 5 and the position signal denoting whether the current flexible filter unit reaches the preset position or not.

In another example, after the flexible filter spectral camera starts working, the tachometer generator 5 is turned on by the controller 6 to start rotating, and after the tachometer generator 5 reaches the target rotating speed, the controller 6 is used to read a rotating speed value of the tachometer generator 5 and the position signal of the flexible filter unit in real time. The controller 6 detects whether the flexible filter unit is located at the preset position or not by using the position signal generated by the linear Hall sensor 3, namely, below the lens. If the flexible filter unit is not at the preset position, the tachometer motor 5 is controlled by the controller 6 to change the rotating speed until the flexible filter unit is rotated to the preset position. If the flexible filter unit is at the preset position, the CMOS module 10 is controlled by the controller 6 to capture the incident light at the same frame rate.

In other embodiments II of the present disclosure, the flexible filter spectral camera may also include a controller 6.

The controller 6 is electrically connected to the tachometer generator 5 and is used to:

determine whether a target flexible filter unit exists at the preset position or not, where the target flexible filter unit is any flexible filter unit, or a flexible filter unit corresponding to a required waveband.

If the target flexible filter unit does not exist at the preset position, the tachometer generator 5 is controlled by the controller 6 to operate, so as to drive the flexible filter module 2 to rotate.

If the target flexible filter unit exists at the preset position, the tachometer generator 5 is controlled by the controller 6 to stop, thus enabling the target flexible filter unit to stay at the preset position.

When a preset condition is satisfied, the target flexible filter unit is redetermined, and then the controller 6 returns to execute the operation of determining whether the target flexible filter unit exists at the preset position or not and subsequent operations.

The redetermined target flexible filter unit includes a flexible filter unit corresponding to the next required waveband, or a flexible filter unit adjacent to the current target flexible filter unit.

In one example, the controller 6 is used to determine whether the target flexible filter unit exists at the preset position or not based on the presence or absence of the position signal.

If no position signal exists, that is, the target flexible filter unit does not exist at the preset position, the tachometer generator 5 is controlled by the controller 6 to change the rotating speed to operate, so as to drive the flexible filter module 2 to rotate.

If the position signal exists, that is, the target flexible filter unit exists at the preset position, the tachometer generator 5 is controlled by the controller 6 to stop rotating, thus enabling the target flexible filter unit to stay at the preset position. When the preset condition is satisfied, the target flexible filter unit is redetermined, and the controller 6 returns to execute the operation of determining whether the target flexible filter unit exists at the preset position or not and subsequent operations. The preset condition includes that the CMOS module 10 completes the capturing of the incident light.

The redetermined target flexible filter unit includes a flexible filter unit corresponding to the next required waveband, or a flexible filter unit adjacent to the current target flexible filter unit.

In the other embodiments III of the present disclosure, the flexible filter spectral camera may also include a controller 6.

The controller 6 is electrically connected to the tachometer generator 5 and is used to:

determine whether a target flexible filter unit exists at the preset position or not, where the target flexible filter unit is any flexible filter unit.

If the target flexible filter unit does not exist at the preset position, the tachometer generator 5 is controlled by the controller 6 to operate, so as to drive the flexible filter module 2 to rotate.

If the target flexible filter unit exists at the preset position, the tachometer generator 5 is controlled by the controller 6 to stop, thus enabling the target flexible filter unit to stay at the preset position.

When a preset condition is satisfied, after controlling the tachometer generator 5 to operate to drive the target flexible filter unit to leave the preset position, the controller 6 returns to execute the operation of determining whether the target flexible filter unit exists at the preset position or not and subsequent operations.

In one example, the controller 6 determines whether a target flexible filter unit exists at the preset position or not based on the presence or absence of the position signal.

If no position signal exists, that is, the target flexible filter unit does not exist at the preset position, the tachometer generator 5 is controlled by the controller 6 to change the rotating speed to operate, so as to drive the flexible filter module 2 to rotate.

If the position signal exists, that is, the target flexible filter unit exists at the preset position, the tachometer generator 5 is controlled by the controller 6 to stop rotating, thus enabling the target flexible filter unit to stay at the preset position. When the preset condition is satisfied, after controlling the tachometer generator 5 to operate to drive the target flexible filter unit to leave the preset position, the controller 6 returns to execute the operation of determining whether the target flexible filter unit exists at the preset position or not and subsequent operations. The preset condition includes that the CMOS module 10 completes the capturing of the incident light.

The CMOS module 10 is described in detail below.

Figure 3:
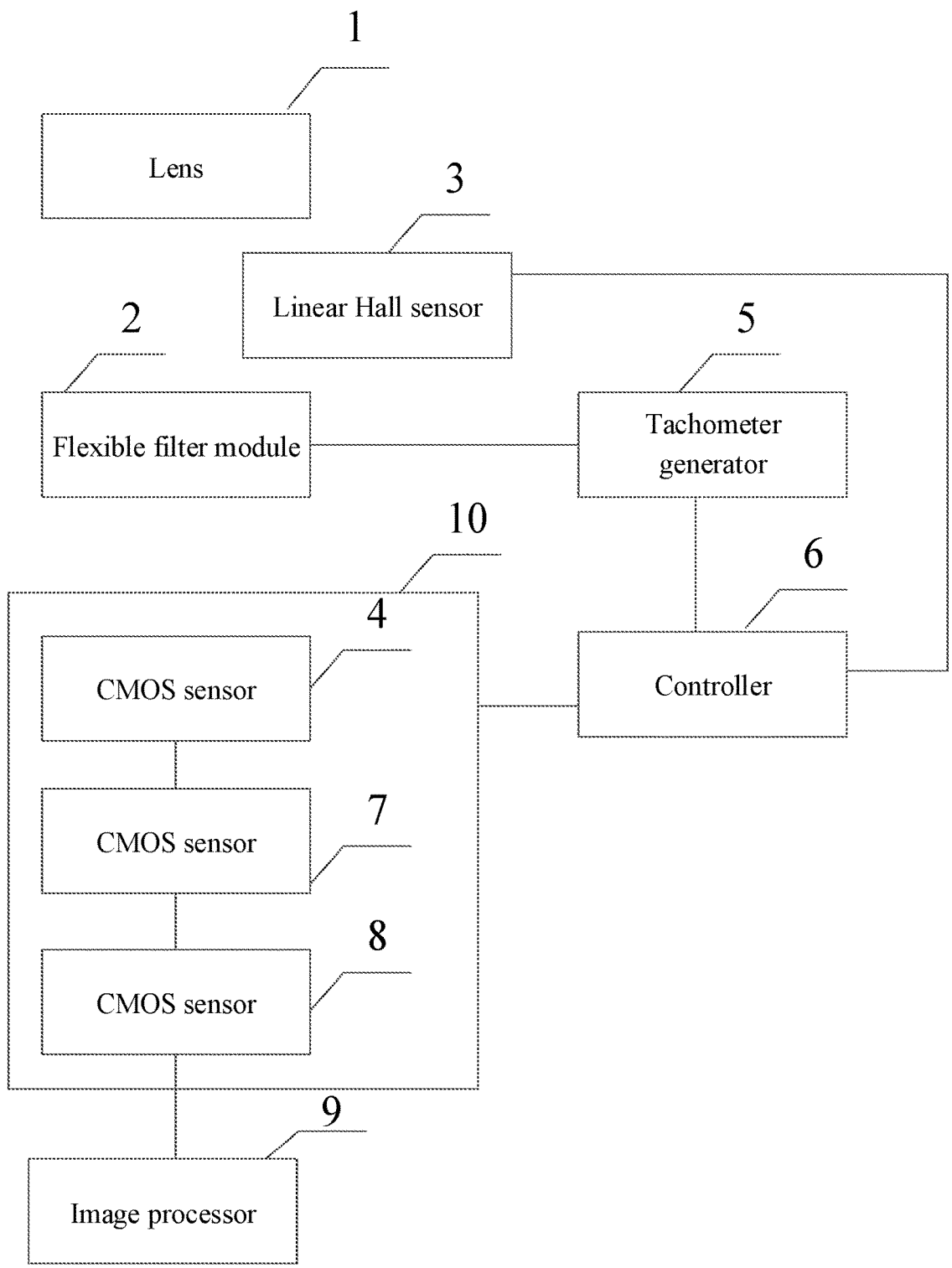
FIG. 3 is a schematic diagram of a detailed connection of a flexible filter spectral camera in accordance with an embodiment of the present disclosure.

Please referring to FIG. 3, the CMOS module 10 includes a CMOS sensor 4, which is used to convert incident light into an analog electrical signal.

In one example, the CMOS sensor 4 may convert the captured incident light at different wavebands into different analog electrical signals.

The CMOS module 10 further includes an analog-to-digital converter 7 and an amplifier 8.

The analog-to-digital converter 7 is electrically connected to the CMOS sensor 4, and is used to convert the analog electrical signal into a digital signal.

The amplifier 8 is electrically connected to the analog-to-digital converter 7, and is used to amplify the digital signal, so as to form an amplified digital signal.

Embodiments in this specification are described in a progressive manner, each embodiment focuses on differences from other embodiments, and the same and similar parts between the embodiments can be referred to each other. Since the system disclosed in the embodiments correspond to the method disclosed by the embodiments, the description thereof is relatively simple, and for relevant matters references may be made to the description of the method.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A flexible filter spectral camera, comprising:
   a lens;
   a flexible filter module, comprising N flexible filter units corresponding to N different wavebands, respectively, wherein N is a positive integer greater than or equal to 2;
   a CMOS (Complementary Metal Oxide Semiconductor) module, used to convert incident light into a digital signal, wherein any one of N flexible filter units is able to be switched to a preset position to filter light emitted from the lens, and to transmit light at a corresponding waveband to the CMOS module, and the preset position is between the lens and the CMOS module;
   an image processor, connected to the CMOS module, and used to convert the digital signal into an image;
   a magnetic intensity code arranged on any flexible filter unit, wherein the magnetic intensity code is used to characterize a first wavelength threshold and a second wavelength threshold corresponding to the any flexible filter unit; and
   a linear Hall sensor, located at the preset position, wherein the linear Hall sensor is used to generate a sensing signal as a position signal under an action of the magnetic intensity code on the any flexible filter unit when the any flexible filter unit reaches the preset position.

2. The flexible filter spectral camera according to claim 1, wherein a wavelength range of a waveband corresponding to any flexible filter unit is determined by the first wavelength threshold and the second wavelength threshold, and the first wavelength threshold is greater than the second wavelength threshold;
   the any flexible filter unit comprises:
   a short-wave pass filter for the passing of light shorter than the first wavelength threshold and cutting off light longer than the first wavelength threshold;
   a long-wave pass filter for the passing of the light longer than the second wavelength threshold and cutting off the light shorter than the second wavelength threshold.

3. The flexible filter spectral camera according to claim 2, wherein the short-wave pass filter and the long-wave pass filter are overlapped.

4. The flexible filter spectral camera according to claim 1, further comprising:
   a tachometer generator, connected to the flexible filter module, and used to drive the flexible filter module to rotate, thus enabling each flexible filter unit to reach the preset position;
   wherein the tachometer generator is also used to measure a rotating speed value thereof.

5. The flexible filter spectral camera according to claim 4, further comprising:
   a controller, connected to the tachometer generator, and used to:
   control the tachometer generator to operate, so as to drive the flexible filter module to rotate;
   control the CMOS module to convert incident light into a digital signal at a target frame rate when detecting a presence of a target flexible filter unit at the preset position, wherein the target flexible filter unit is any flexible filter unit, or a flexible filter unit corresponding to a required waveband.

6. The flexible filter spectral camera according to claim 4, further comprising:
   a controller, connected to the tachometer generator, and used to:
   determine whether a target flexible filter unit exists at the preset position or not, wherein the target flexible filter unit is any flexible filter unit, or a flexible filter unit corresponding to a required waveband;
   if the target flexible filter unit does not exist at the preset position, control the tachometer generator to operate, so as to drive the flexible filter module to rotate;
   if the target flexible filter unit exists at the preset position, control the tachometer generator to stop, thus enabling the target flexible filter unit to stay at the preset position; and,
   when a preset condition is satisfied, redetermine a target flexible filter unit, and return to execute the operation of determining whether the target flexible filter unit exists at the preset position or not and subsequent operations; wherein
   the redetermined target flexible filter unit comprises a flexible filter unit corresponding to the next required waveband, or a flexible filter unit adjacent to the target flexible filter unit.

7. The flexible filter spectral camera according to claim 4, further comprising:
   a controller, connected to the tachometer generator, and used to:
   determine whether a target flexible filter unit exists at the preset position or not, wherein the target flexible filter unit is any flexible filter unit;
   if the target flexible filter unit does not exist at the preset position, control the tachometer generator to operate, so as to drive the flexible filter module to rotate;
   if the target flexible filter unit exists at the preset position, control the tachometer generator to stop, thus enabling the target flexible filter unit to stay at the preset position; and,
   when a preset condition is satisfied, after controlling the tachometer generator to operate to drive the target flexible filter unit to leave the preset position, return to execute the operation of determining whether the target flexible filter unit exists at the preset position or not and subsequent operations.

8. The flexible filter spectral camera according to claim 1, wherein the CMOS module comprises:
   a CMOS sensor, used to convert incident light into an analog electrical signal.

9. The flexible filter spectral camera according to claim 8, wherein the CMOS module further comprises:
   an analog-to-digital converter, connected to the CMOS sensor, and used to convert the analog electrical signal into a digital signal; and
   an amplifier, connected to the analog-to-digital converter, and used to amplify the digital signal, so as to form an amplified digital signal.

* * * * *